POSITION INDICATING SYSTEM

Filed Dec. 12, 1946 2 SHEETS—SHEET 1

INVENTOR
PHILIP J. HERBST
BY H. G. Grover
ATTORNEY

INVENTOR
PHILIP J. HERBST
BY [signature]
ATTORNEY

Patented Jan. 8, 1952

2,581,589

UNITED STATES PATENT OFFICE 2,581,589

POSITION INDICATING SYSTEM

Philip J. Herbst, Princeton, N. J., assignor to Radio Corporation of America, a corporation of Delaware Application December 12, 1946, Serial No. 715,680

11 Claims. (Cl. 178—6.8)

This invention relates to position finding and more particularly to a system wherein an image is scanned electrically and the position of a specific point in the image is located by resolving the signal obtained from the scanning operation.

Many electronic devices have been developed and produced for the purpose of position finding.

In many applications of electronics to commercial devices, it is desirable to provide an electronic device which will locate objects or move objects to a predetermined location.

Most objects have a physical characteristic which makes them subject to detection by optical means. Usually an object may be optically distinguished from its adjacent surroundings.

Very often it is desirable to transmit the positioning information to a remote location. This can best be accomplished by electrical devices, and the electrical transmission of optical images is most satisfactorily accomplished by analyzing a scene into its image elements, which are selected from the image area in the orderly sequence of scanning, and transmitting one after the other. Since the scanning and image repetition processes are essentially artificial ones, there may be selected arbitrarily the scanning pattern. It is well known that during the scanning operation, a signal is produced, the amplitude of which is dependent upon the brightness of the elements of the image.

It will therefore be seen that the relative position of a predetermined point in an image can be located by electronic scanning of the image.

According to this invention, an image of an area in which there is located a point or object, the relative position of which is desired, is scanned with an electron beam and the relative position of the point or object is derived from the signal obtained from the scanning operation.

If the point or object, the position of which is being determined, moves with respect to the position finder, an electro-mechanical circuit can be provided which will cause the position finder to follow the movement of the point or object. This is called automatic tracking.

According to this invention in one of its preferred forms, the orientation of the image pick-up or camera tube utilized for translating the image into an electrical signal is automatically controlled such that it will follow a moving point or object in its field of view.

A primary object of this invention is to provide an improved relative position indicating system.

Another object of this invention is to provide an electronic system for equipment orientation.

Other and incidental objects of the invention will be apparent to those skilled in the art from a reading of the following specification and an inspection of the accompanying drawing in which Figure 1 is a block diagram illustrating a preferred form of this invention;

Figure 1:
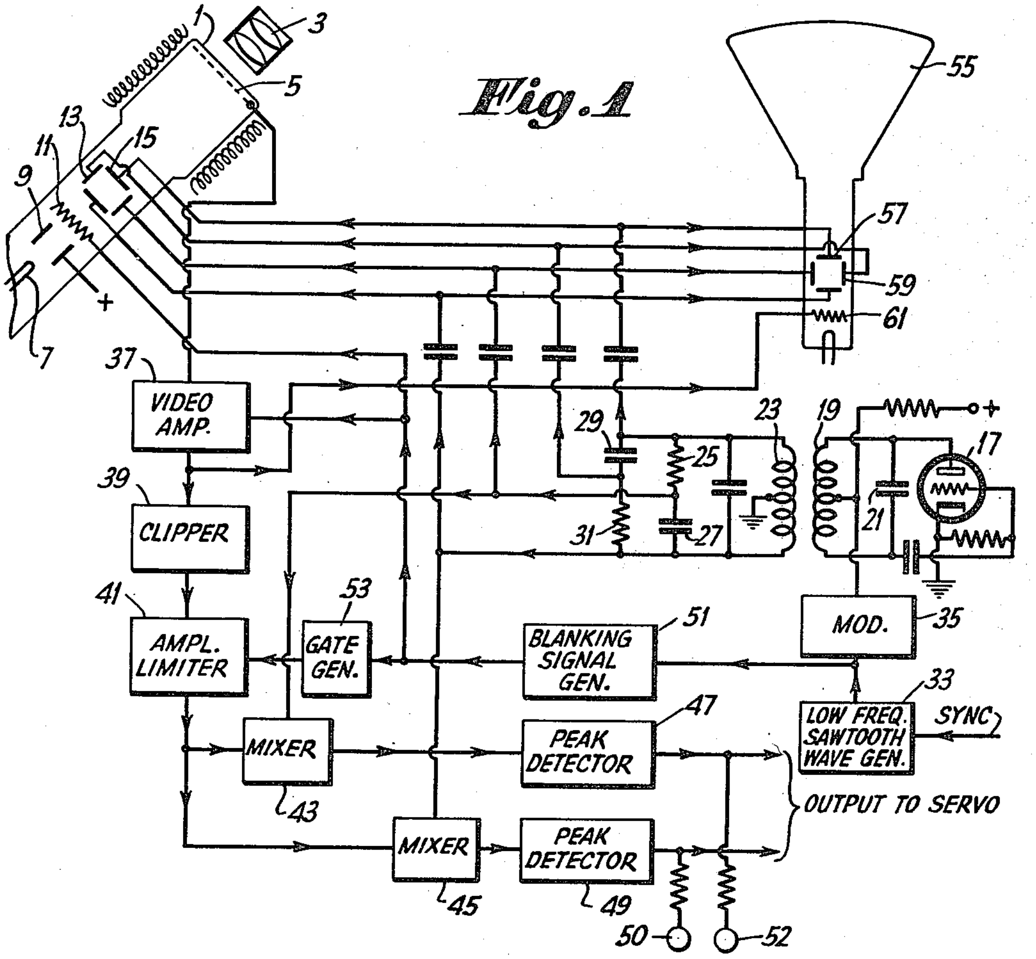

Turning now in more detail to Figure 1, there is shown an image pick-up or camera tube 1 which may take different forms, but for the purpose of explanation an orthicon tube, which is of the so-called storage variety, will be illustrated as part of this preferred form of the invention. Such a tube is well known and was described by Albert Rose and Harry Iams in an article entitled "The Orthicon, a Television Pick-Up Tube," beginning on page 186 of the "RCA Review" for October, 1939, volume 4, No. 2.

The principle of light storage employed in image tubes is well known to the art and involves setting up an image electrode or mosaic 5, the surface of which is illuminated with an image through the lens system 3. The light sensitive electrode 5 possesses the characteristics of photosensitivity and electrical insulation. The photosensitivity characteristic is employed to release electrons from the surface in the form of an electron image.

An electron gun containing cathode 7 and anode 9 and a control electrode 11 produces a narrow beam of electrons which is utilized as a scanning agent and is directed toward the light sensitive electrode 5. The electron beam is deflected to scan the area of a light sensitive electrode 5 by suitable well-known deflecting means, as described in the article above mentioned. The deflecting means for the scanning beam are shown herein for convenience as the horizontal deflecting plates 13 and the vertical deflecting plates 15. The terminology "horizontal and vertical" is intended to be merely relative and may take any position, provided a similar position is utilized in the image reproducing device.

It is necessary to provide a scanning pattern which will furnish a signal from which can be derived an expression of relative position. It is most desirable that the scanning pattern be composed of a set of lines spaced in width of the electron beam at the point of intersection of the beam and the light sensitive electrode 5, so that the total area of the electrode 5 will be scanned. The speed of the scanning motion must be constant along the scanning line in order that relative position data may be transmitted electrically.

According to this invention, a spiral pattern of scanning is utilized.

The two direction deflection which is necessary to provide such a spiral scanning pattern may be furnished by a tube 17 which, together with inductance 19 and condenser 21, forms an oscillating circuit to provide a sine wave.

Inductance 19 forms part of a transformer including a center tapped secondary coil 23, which contains two series circuits of resistance and capacity, such as resistance 25, capacity 27, capacity 29, and resistance 31. The purpose of these two series resistance and capacity circuits is to derive from the sine wave oscillator including the tube 17, two sine waves which are maintained in a 90° phase relationship. It is well known that two sine waves having a 90° phase relationship may be derived from a single sine wave, and there are various electrical means for its accomplishment.

It will be seen that one sine wave is applied to the horizontal deflecting plates 13 and another sine wave is applied to the vertical deflecting plates 15 of the camera or image pick-up tube 1. The application of two sine waves out of phase by 90° to vertical and horizontal deflecting plates will result in a circular scanning. If, however, the amplitude of both the sine waves is varied in accordance with the sawtooth wave form, there will result a spiral scanning pattern.

By applying an auxiliary synchronizing signal to a sawtooth wave generator 33, there may be produced a sawtooth wave whose frequency should be low with respect to the frequency of the sine wave generator including tube 17.

Sawtooth wave generators are well known in the art and may, for example, take the form of the sawtooth wave generator included in the deflection system shown and described in U. S. patent to W. A. Tolson, No. 2,101,520, dated December 7, 1937.

By modulating the sine wave generator with the sawtooth wave through the modulator 35, a pair of sawtooth wave modulated sine waves in 90° phase relationship may be produced to provide spiral scanning for the image tube 1.

The signal obtained from camera or image pick-up tube 1 is amplified in video amplifier 37 and passed through a clipper circuit 39, which operates to pass only signals above a predetermined amplitude. It will be seen that if the object, the position of which is desired, has a characteristic illumination different than its associated background, the clipper circuit 39 will easily distinguish the signal resulting from the scanning of the predetermined point of the image located on electrode 5. Clipper circuits are also known in the art and may, for example, take the form of the clipper circuit shown and described in connection with the television synchronizing signal clipping circuit shown and described beginning on page 373 of the book entitled "Principles of Television Engineering" by Donald G. Fink, published in 1940.

The energy pulse obtained from the clipper 39 is passed to the amplifier and limiter 41. The purpose of the amplifier and limiter 41 is to provide an energy pulse whose amplitude is the same for each pulse, regardless of the amplitude of the energy pulse obtained from the clipper circuit 39.

A suitable limiter is shown and described beginning on page 414 of the book entitled "Practical Radio Communication" by Arthur R. Nilson and J. L. Hornung, published in 1943.

The signal from the amplifier and limiter 41 is passed to the mixer 43 and mixer 45, wherein it is combined with the deflection signal applied to the image tube 1. One sawtooth wave modulated sine wave is applied to mixer 43, the other sawtooth wave modulated sine wave, which is 90° out of phase with the first sawtooth wave modulated sine wave, is applied to the mixer 45.

Peak detector 47 and peak detector 49 are connected to the mixer 43 and mixer 45, respectively, to derive therefrom a signal whose amplitude is governed by the position of the energy pulse obtained from the amplifier limiter 41 on each of the sawtooth wave modulated sine waves. This operation will be explained in detail below in connection with Figure 2.

The output of the peak detectors 47 and 49 may be fed to indicating devices 50 and 52 and respectively indicate elevation and azimuth deviation from the center of the orientation of the image tube 1. Indicating devices 50 and 52 are of the type which are responsive to variations in electrical energy.

The output signal of peak detector 49 may be transmitted to a mechanical servo system 54 or any other device capable of changing electrical energy into mechanical movement of an amount directly proportional to the electrical energy. Likewise, peak detector 47 may also furnish electrical energy to a servo system 56 to control movement or position at right angles to the control exercised by the servo operating from the electrical energy produced by peak detector 49.

Figure 3:
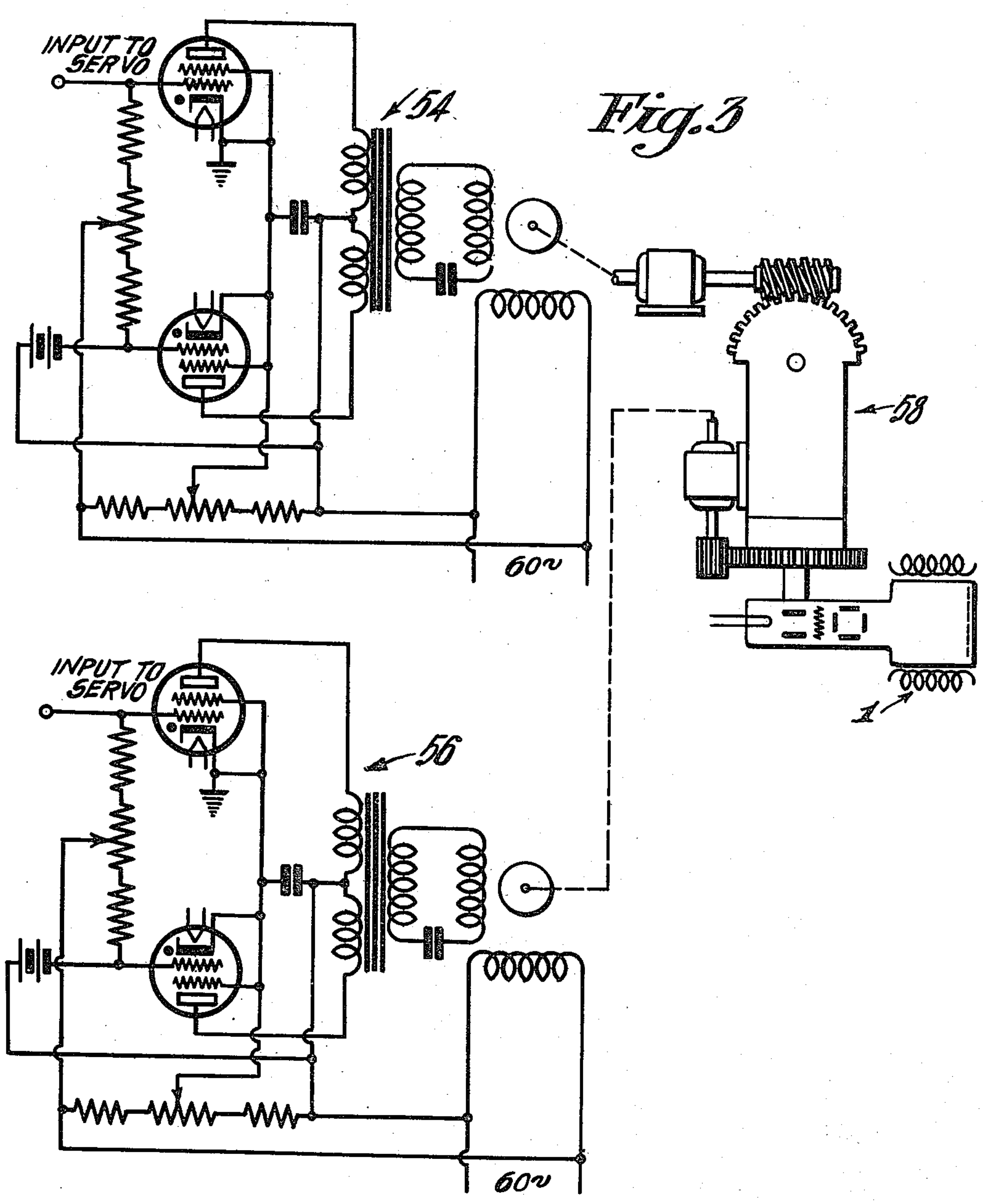
Figure 3 illustrates one form of servo-mechanism which may be used in conjunction with this invention.

A typical servo mechanism is shown and described as part of my U. S. Patent 2,532,063, granted November 28, 1950. Another well known arrangement of servo-mechanisms for effecting the desired tracking movements is shown in Figure 3 wherein servo-mechanisms 54 and 56 are copied from and described in "Multiwinding Motors for Electronic Uses," Electronic Industries, April 1944, page 102, and also shown in the Handbook of Industrial Electronic Circuits by Markus and Zeluff, page 143. The mechanical mechanism 58 for movement of the camera tube 1 is shown in Graham 2,403,975, Figure 1, issued July 16, 1946.

It will be seen that in a spiral scanning pattern, it is necessary that the cathode ray return rapidly from the end of the spiral pattern to the beginning of the spiral pattern to repeat the scanning operation at a frequency equal to the sawtooth wave frequency. During this return interval, spurious signals would be produced if a means were not provided to blank the signal transmission system during the time interval occupied by the return trace. This is accomplished by providing a blanking signal generator 51 which obtains its keying signal from the low frequency sawtooth wave generator 33 and provides a negative keying signal to the control electrode 11 of the image tube 1 and the video amplifier 37.

A suitable blanking amplifier is shown and described beginning on page 297 of the book "Principles of Television Engineering" by Donald G. Fink, referred to above.

It is very often desirable that the system be made responsive only over a predetermined portion of the image area focused on electrode 5. This is particularly true in automatic tracking after the image tube 1 has been oriented directly at the subject. By providing an electrical gate whose timing is controlled in accordance with the blanking signal obtained from the blanking signal generator 51, the amplifier limiter 41 may be made to respond only during a predetermined time interval. Such a device is illustrated in block 53 as a gate generator. The gate generator 53 may take the form of a multivibrator which is also well known in the art.

A typical multivibrator circuit is shown and described beginning on page 402 of the book "Principles of Television Engineering" by Donald G. Fink, referred to above.

For the purpose of monitoring or for the purpose of transmitting the image to a remote position, there is provided an image producing tube 55 which may take the form of a kinescope containing vertical deflection plates 57 and horizontal deflecting plates 59. For the purpose of illustration, the vertical deflection plates 57 obtain their deflection signal from the same source that the vertical deflection plates 15 in the image pickup or camera tube 1 obtain their deflection signal. Likewise, the horizontal deflection plates 15 obtain their energy from the same source as horizontal deflecting plates 13 of image tube 1. There will result a scanning pattern similar to that scanning pattern of image pickup or camera tube 1.

A control electrode 61 of image producing tube 55 is connected to video amplifier 37. Control electrode 61 controls the intensity of the electron beam in image producing tube 55. The operation of the image producing or kinescope tube is well known and also is described in an article by Dr. V. K. Zworykin entitled "Description of a Television System and Kinescope" in the "Proceedings of the Institute of Radio Engineers" for December, 1933.

Figure 2:
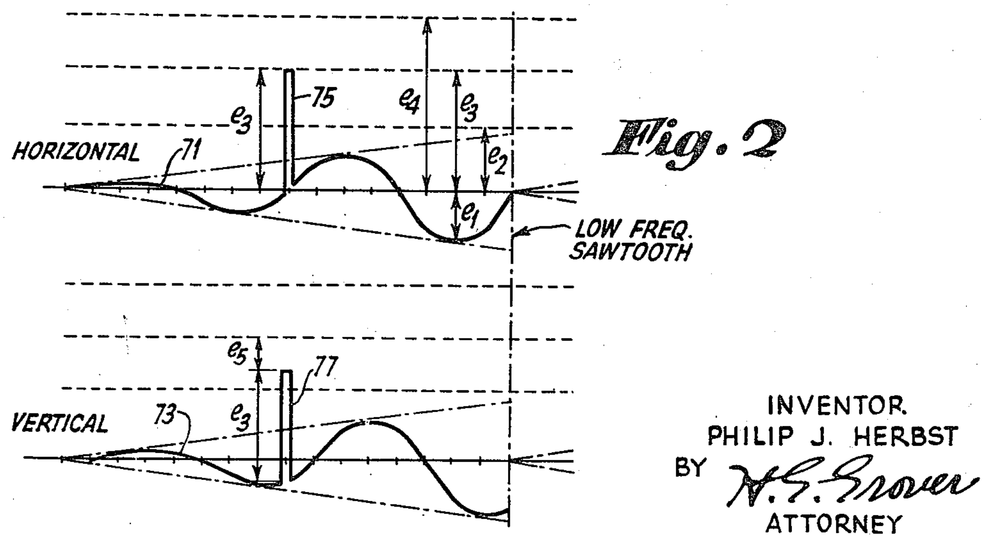
Figure 2 illustrates graphically the operation of this invention.

The operation of this invention may best be explained by reference to Figure 2, wherein there is graphically shown a deflection signal for providing both horizontal and vertical deflection when applied to the deflecting elements of image pickup or camera tube 1.

There is shown a sawtooth wave modulated sine wave 71 and a second sawtooth wave modulated sine wave 73, each of which are indicated in a phase difference of 90° with each other, and having a maximum peak potential of $e_1$.

An energy pulse 75 is added to sine wave 71, and the same energy pulse 77, occurring at the same time, is added to sine wave 73.

Although the energy pulses 75 and 77 are of equal amplitude $e_3$, it will be seen that their peak voltage with respect to a reference level is different.

If, for example, the peak detectors referred to in connection with Figure 1 are so biased that potential $e_3$ is normal, $e_2$ is a minimum, and $e_4$ is a maximum, the position of the energy pulse on the sine waves will govern the peak voltage which may be obtained from the peak detectors. For example, the position indicated in Figure 2 will cause no current flow in the horizontal system. However, there is a voltage difference $e_5$ produced in the vertical system. This voltage $e_5$ may be utilized to provide a mechanical movement of either an auxiliary equipment or to provide automatic tracking of the image tube 1.

It will be seen that, by properly utilizing the potential $e_5$, the mechanical movement may be provided to position the object or orient the image tube 1 such that both signal pulses 75 and 77 will occur at the beginning of the low frequency sawtooth wave and thus have no potential difference with respect to the reference voltage $e_3$.

Having thus described the invention, what is claimed is:

1. A position indicating system comprising in combination an image pickup tube wherein an electron beam is developed for scanning an electrode adapted to receive an image, horizontal and vertical deflection elements for controlling the deflection of said beam, a deflection signal generator having an output circuit connected to said beam deflection elements and having means to produce in said output circuit two sine waves in a 90° relationship, a sawtooth wave generator having an output circuit connected to said deflection signal generator to modulate the output of said deflection signal generator in accordance with the amplitude of said sawtooth wave, means for deriving from said image pickup tube an energy pulse of predetermined amplitude when a selected point of said image is scanned by said electron beam, a pair of mixer circuits connected between said energy pulse deriving means and said output circuit of said deflection signal generator for combining said energy pulse with both said modulated deflection signals, and means responsive to the position of said energy pulse on said deflection signals to indicate relative position of said point on said image.

2. A position indicating system comprising in combination an image pickup tube having an electron beam developed therein for scanning an electrode adapted to receive an image, horizontal and vertical deflection elements for controlling the deflection of said beam, a spiral scanning type deflection signal generator having an output circuit connected to said beam deflection elements, a sawtooth wave generator having an output circuit connected to said deflection signal generator to modulate the output of said deflection signal generator in accordance with the amplitude of said sawtooth wave, means for deriving from said image pickup tube an energy pulse of predetermined amplitude when a selected point of said image is scanned by said electron beam, a pair of mixer circuits connected between said energy pulse deriving means and said output circuit of said deflection signal generator for combining said energy pulse and said modulated deflection signals, and means responsive to the position of said energy pulse on said deflection signals to indicate relative position of said point on said image.

3. A position indicating system comprising in combination an image pickup tube having therein means to develop an electron beam and an electrode adapted to receive an image, horizontal and vertical deflection elements for producing, when energized, a deflection of said beam, a deflection signal generator having an output circuit connected to said beam deflection elements and having a first source of sine wave energy, a second source of sine wave energy whose frequency coincides with the frequency of said first source of sine wave energy, and means for maintaining the output energy from said first and second source of sine wave energy in a 90° phase relationship, a sawtooth wave generator having an output circuit connected to said deflection signal generator to modulate the output of said deflection signal generator in accordance with the amplitude of said sawtooth wave, the frequency of said sawtooth waves being much lower than the frequency of said sine waves, means for deriving from said image pickup tube an energy pulse of predetermined amplitude when a selected point of said image is scanned by said electron beam, a pair of mixer circuits connected between said energy pulse deriving means and said output circuit of said deflection signal generator for combining said energy pulse and said modulated deflection signals, and means responsive to the position of said energy pulse on said deflection signals to indicate relative position of said point on said image.

4. A position indicating system comprising in combination an image pickup tube having an electron beam developing gun structure included therein and an electrode adapted to receive an image, horizontal and vertical deflection elements for controlling, when energized, the deflection of said beam, a deflection signal generator having an output circuit connected to said beam deflection elements and having means to produce in said output circuit two sine waves in a 90° phase relationship, a sawtooth wave generator having an output circuit connected to said deflection signal generator to modulate the output of said deflection signal generator in accordance with the amplitude of said sawtooth wave, the frequency of said sawtooth waves being much lower than the frequency of said sine waves, a signal clipper connected to said image pickup tube, a signal limiter connected to said clipper, a pair of mixer circuits connected between said signal limiter and said output circuit of said deflection signal generator for combining the output signal of said limiter and said modulated deflection signals, and means responsive to the position of said energy pulse on said deflection signals to indicate relative position of said point on said image.

5. A position indicating system comprising in combination an image pickup tube having means therein to develop an electron beam and an electrode adapted to receive an image and also to be scanned by said beam, horizontal and vertical deflection elements for controlling the position at which the said beam impinges upon said electrode, a spiral deflection signal generator having an output circuit connected to said beam deflection elements, means for deriving from said image pickup tube an energy pulse of predetermined amplitude when a selected point of said image is scanned by said electron beam, a mixer circuit connected between said energy pulse deriving means and said output circuit and one of said deflection signal generator for combining said energy pulse and said deflection signal, and means responsive to the position of said energy pulse on said deflection signal to indicate relative position of said point on said image.

6. A position indicating system comprising in combination an image pickup tube having means to form an electron beam and an electrode, both adapted to be scanned by the beam and to receive an image, horizontal and vertical deflection elements for said beam, a deflection signal generator to produce two sawtooth wave modulated sine waves, said sine waves being in a 90° phase relationship with each other, said deflection signal generator connected to said deflection elements, means for deriving from said image pickup tube an energy pulse of predetermined amplitude when a selected point of said image is scanned by said electron beam, a pair of mixer circuits connected between said energy pulse deriving means and said deflection signal generator for combining said energy pulse with each of said modulated sine waves, and a peak detector connected to each of said mixer circuits to derive therefrom energy pulses representative of the horizontal and vertical distance of said selected point from a reference position on said image.

7. A position indicating system comprising in combination an image pickup tube having a target electrode adapted to receive an image and an electron beam developing means for producing a beam to scan the target, horizontal and vertical deflection elements for deflecting said beam relative to the target, a deflection signal generator to produce two sawtooth wave modulated sine waves, said sine waves being in a 90° relationship with each other, said deflection signal generator connected to said deflection elements, means for deriving from said image pickup tube an energy pulse of predetermined amplitude when a selected point of said image is scanned by said electron beam, a pair of mixer circuits connected between said energy pulse deriving means and said deflection signal generator for combining said energy pulse with each of said modulated sine waves, a peak detector connected to each of said mixer circuits to derive therefrom energy pulses representative of the horizontal and vertical distance of said selected point from a reference position on said image, and a servo mechanism connected to said peak detectors to translate the relative position of said predetermined point with respect to a reference position on said image into mechanical movement.

8. A position indicating system comprising in combination an image pickup tube having an electrode adapted to receive an image and electron beam developing means to produce a beam to scan said electrode, horizontal and vertical deflection elements for said beam, a deflection signal generator to produce two sawtooth wave modulated sine waves, said sine waves being in a 90° phase relationship with each other, said deflection signal generator connected to said deflection elements, means for deriving from said image pickup tube an energy pulse of predetermined amplitude when a selected point of said image is scanned by said electron beam, a pair of mixer circuits connected between said energy pulse deriving means and said deflection signal generator for combining said energy pulse with each of said modulated sine waves, a peak detector connected to each of said mixer circuits to derive therefrom energy pulses representative of the horizontal and vertical distance of said selected point from a reference position on said image, and a servo mechanism electrically connected to said peak detectors to translate the relative position of said predetermined point with respect to a reference position on said image into mechanical movement and mechanically connected to said image pickup tube to control the orientation of said image pickup tube.

9. A position indicating system comprising in combination an image pickup tube having means to develop an electron beam and an electrode adapted to receive an image, horizontal and vertical deflection elements for deflecting said beam relative to the electrode, a spiral deflection signal generator having an output circuit connected to said beam deflection elements, means for deriving from said image pickup tube an energy pulse of predetermined amplitude when a selected point of said image is scanned by said electron beam, a pair of mixer circuits connected between said energy pulse deriving means and said deflection signal generator for combining said energy pulse with said deflection signal, a peak detector connected to each of said mixer circuits to derive therefrom energy pulses representative of the horizontal and vertical distance of said selected point from a reference position on said image, a position indicating device, a servo mechanism electrically connected to said peak detectors to translate the relative position of said predetermined point with respect to a reference position on said image into mechanical movement and mechanically connected to said position indicating device to control the orientation of said position indicating device.

10. A position indicating system comprising in combination an image pickup tube having means to produce an electron beam and to direct said beam upon an electrode adapted to receive an image, horizontal and vertical deflection elements for controlling the position of impact of said beam on the electrode, a deflection signal generator having an output circuit connected to said beam deflection elements and having means to produce in said output circuit two sine waves in a 90° phase relationship, a sawtooth wave generator having an output circuit connected to said deflection signal generator to modulate the output of said deflection signal generator in accordance with the amplitude of said sawtooth wave, the frequency of said sawtooth waves being much lower than the frequency of said sine waves, means for deriving from said image pickup tube an energy pulse of predetermined amplitude when a selected point of said image is scanned by said electron beam, an electrical gate generator connected to said energy pulse deriving means to make said energy pulse deriving means responsive only during a predetermined interval of time, a pair of mixer circuits connected between said energy pulse deriving means and said output circuit of said deflection signal generator for combining said energy pulse and said modulated deflection signals, and means responsive to the position of said energy pulse on said deflection signals to indicate relative position of said point on said image.

11. A position indicating system comprising in combination an image pickup tube having an electron gun to produce an electron beam and to direct said beam toward an electrode adapted to receive an image, horizontal and vertical deflection elements for causing a scanning of the electrode by said beam, a deflection signal generator having an output circuit connected to said beam deflection elements and having means to produce in said output circuit two sine waves in a 90° phase relationship, a sawtooth wave generator having an output circuit connected to said deflection signal generator to modulate the output of said deflection signal generator in accordance with the amplitude of said sawtooth wave, the frequency of said sawtooth waves being much lower than the frequency of said sine waves, means for deriving from said image pickup tube an energy pulse of predetermined amplitude when a selected point of said image is scanned by said electron beam, an electrical gate generator connected to said energy pulse deriving means to make said energy pulse deriving means responsive only during a predetermined interval of time, said interval of time recurring at said deflection frequency, a pair of mixer circuits connected between said energy pulse deriving means and said output circuit of said deflection signal generator for combining said energy pulse and said modulated deflection signals, and means responsive to the position of said energy pulse on said deflection signals to indicate relative position of said point on said image.

PHILIP J. HERBST.

REFERENCES CITED

The following references are of record in the file of this patent:

UNITED STATES PATENTS

| Number | Name | Date |
|---|---|---|
| 1,470,696 | Nicolson | Oct. 16, 1923 |
| 2,166,712 | Bedford | July 18, 1939 |
| 2,201,978 | Bedford | May 28, 1940 |
| 2,209,507 | Campbell | July 30, 1940 |
| 2,403,975 | Graham | July 16, 1946 |
| 2,409,448 | Rost | Oct. 15, 1946 |
| 2,412,612 | Godet | Dec. 17, 1946 |
| 2,428,946 | Somers | Oct. 14, 1947 |

OTHER REFERENCES

"Electronics," November 1945, pages 104 to 109.